April 25, 1950 D. J. DWYER 2,505,237
RATE OF LOAD CHANGE MEASURING INSTRUMENT
Filed Aug. 18, 1943 3 Sheets-Sheet 1
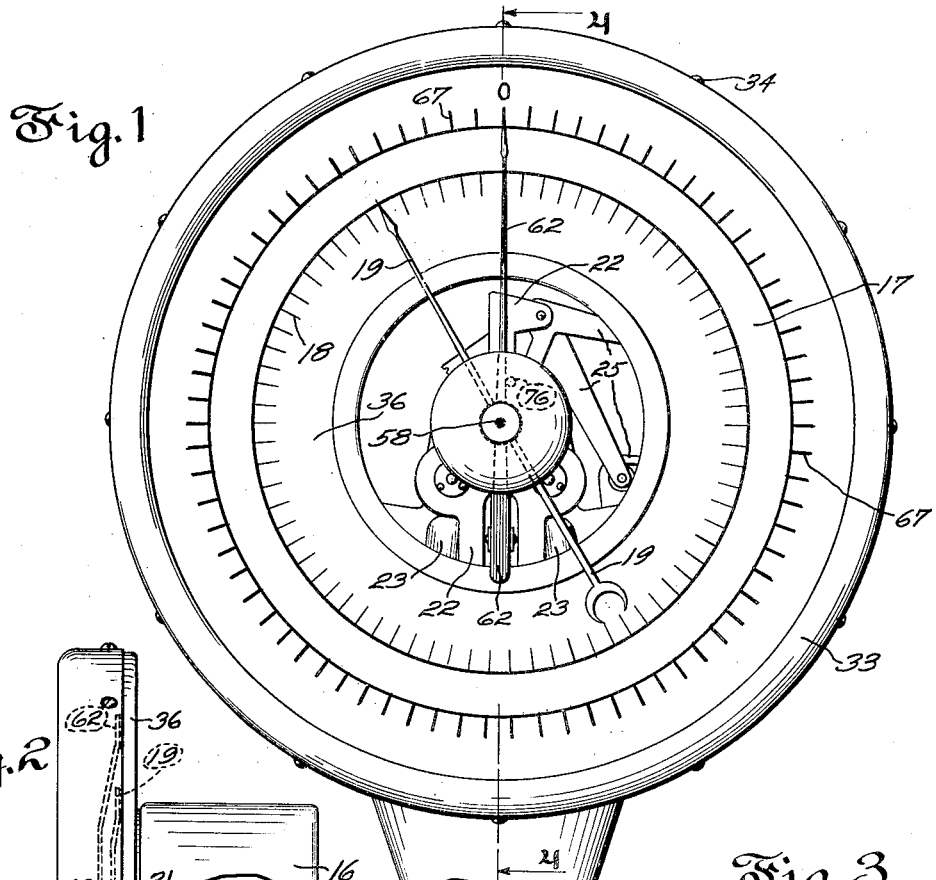
Fig. 1
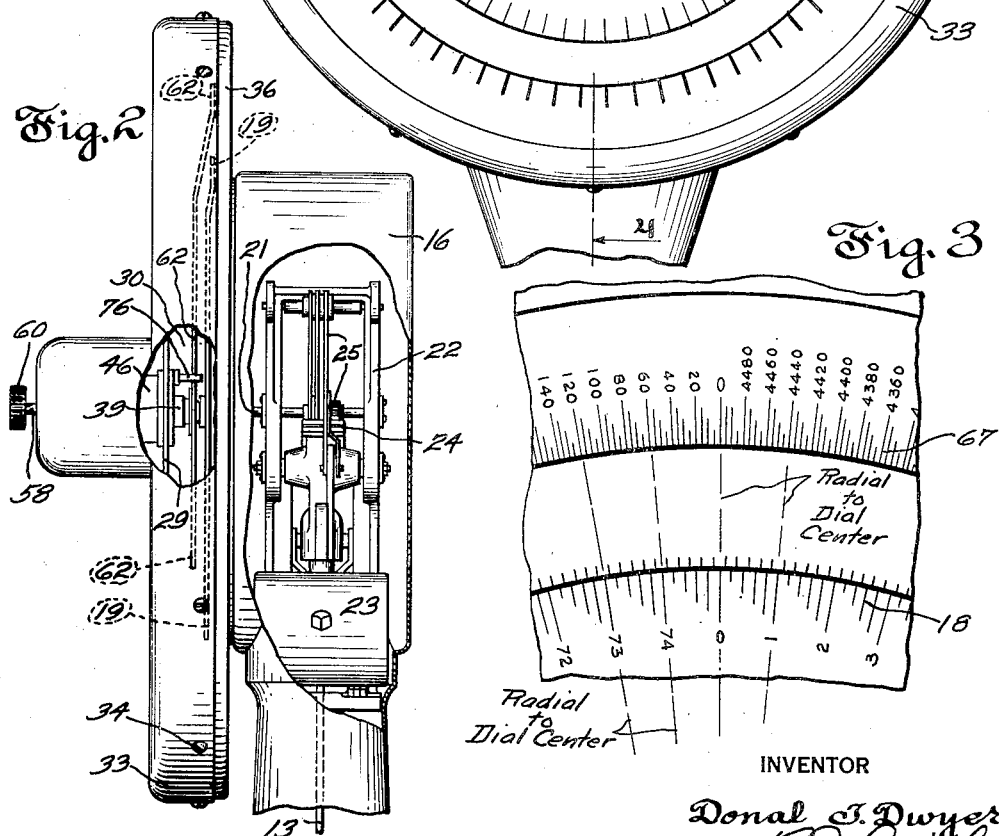
Fig. 2
Fig. 3
INVENTOR
Donal J. Dwyer
ATTORNEY April 25, 1950          D. J. DWYER          2,505,237
RATE OF LOAD CHANGE MEASURING INSTRUMENT
Filed Aug. 18, 1943          3 Sheets-Sheet 2
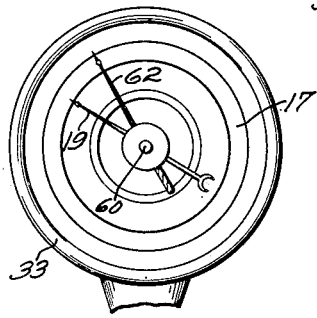
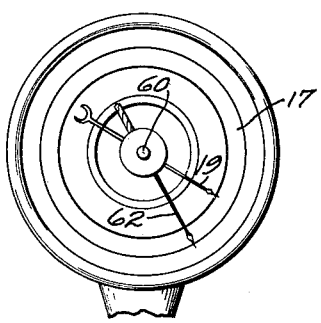
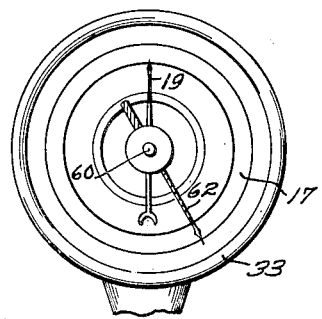
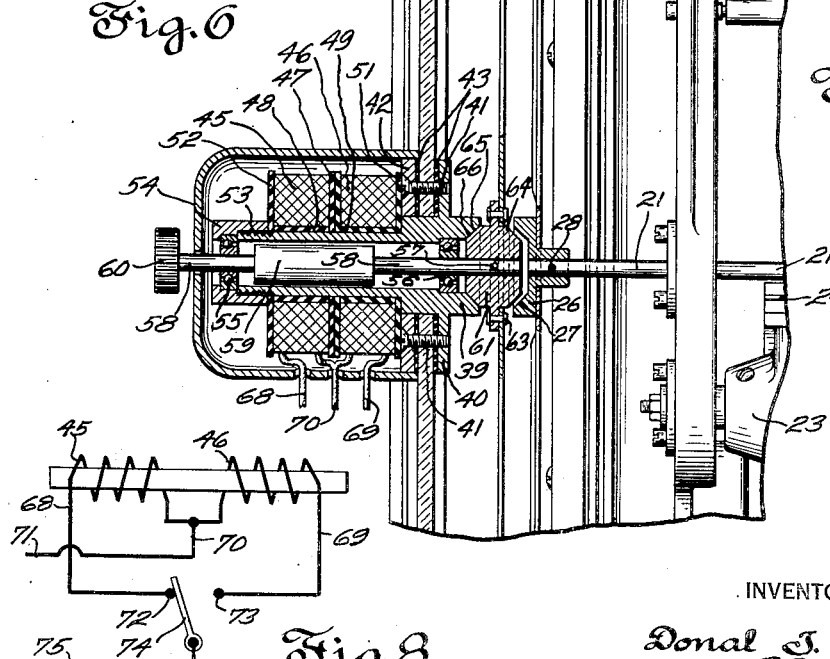
INVENTOR
Donal J. Dwyer
ATTORNEY April 25, 1950          D. J. DWYER          2,505,237
RATE OF LOAD CHANGE MEASURING INSTRUMENT
Filed Aug. 18, 1943          3 Sheets-Sheet 3
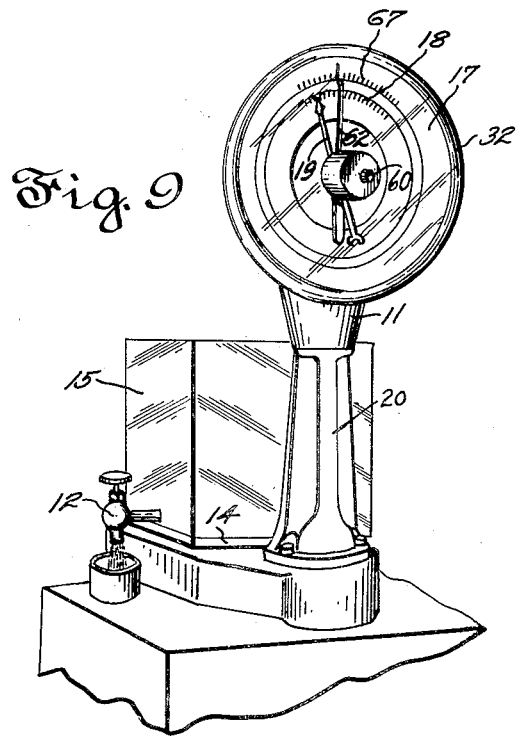
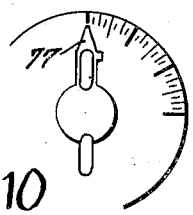
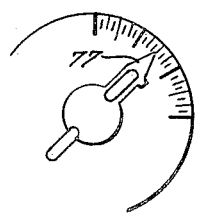
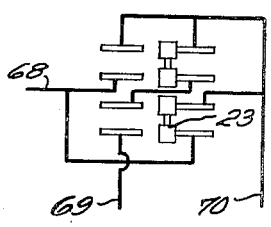
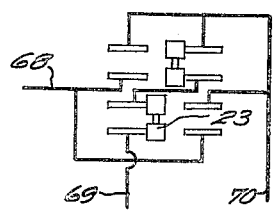
INVENTOR.
Donal J. Dwyer,
BY
ATTORNEY Patented Apr. 25, 1950

2,505,237

UNITED STATES PATENT OFFICE 2,505,237

RATE OF LOAD CHANGE MEASURING INSTRUMENT

Donal J. Dwyer, Detroit, Mich., assignor, by mesne assignments, to The Yale & Towne Manufacturing Company, Stamford, Conn., a corporation of Connecticut Application August 18, 1943, Serial No. 499,077

8 Claims. (Cl. 265—27)

1

This invention relates to the art of producing a direct-reading indication of measurable rates of change in a condition thereby, for example, to register automatically the rate at which a weighable load decreases or increases as a fluid or other flowable substance constituting such load enters or leaves a weighable container.

In the art of measuring rates of flow it is possible to take note of the interval of time that is consumed by the progressive travel of a weight indicating pointer over some observed portion of a scale of weight indicating graduations, and from the data so obtained to compute the rate of load change or the rate of flow of fluid out of a container of fluid being weighed. But this entails a separate, time consuming, laborious series of computations corresponding to each different use of the instrument before the desired rate of load change can be known and expressed in simple terms such as "gallons per hour."

It is a principal object of the present invention to save the time and labor that would be consumed by the constantly required repetitious computations referred to, and to avoid human errors that are most likely to result from a practice of making extensive computations each time it is desired to know or record the rate of change of weight undergone by a weighable load over a given period of time or the rate of change which is undergone by any other variable condition that can be measured automatically by an instrument.

The present improvements aim to provide a rate meter involving a condition measuring instrument in which such instrument may continue its function of detecting a progressive change that is taking place in some measurable condition, and in which meter at any time during the progress of such change of condition a marker indicator may be set in motion to perform an excursion of timed duration correlated to the detecting function of the instrument and may thereafter come to rest and remain stationary independently of the measuring instrument in a position registering the rate of change undergone by the condition during such excursion.

In one field of practical use, it is an important object of these improvements to provide weighing apparatus, inclusive of a register, wherein during the flow of liquid lubricant to the bearings of different kinds of motors or engines, or during the consumption of liquid fuel fed to an internal combustion engine, the rate of such flow or consumption may be read without computation directly in terms of gallons per hour or in terms of any other desired units of liquid quantity per

2 unit of time by reference solely to the attained stationary position of a single indicator.

These and other objects of the invention will become clearer from the following description of a practical embodiment of the improvements, which description has reference to the accompanying drawings wherein:

Fig. 1 is a front view of the dial head unit of a pendulum type of weighing scale and associated instrumentalities embodying the present invention.

Fig. 2 is a side view looking from the right at Fig. 1 with the casing sections partly broken away to expose the load counterbalancing and rate of change registering mechanisms.

Fig. 3 is an enlarged detail of certain of the graduations and indicia roughly indicated on the face of the dial chart of Fig. 1.

Fig. 4 is an enlarged fragmentary view taken partially in section on the plane 4—4 in Fig. 1.

Figs. 5, 6 and 7 show on a much smaller scale different positions of associated indicating pointers which sweep the dial of Fig. 1.

Fig. 8 is a diagram of circuit connections to the electrical part of the apparatus which appears in Fig. 4.

Fig. 9 is a perspective view of a complete weighing scale supporting a weighable container of outflowing liquid whose average rate of outflow is to be registered by the improved ways and means hereof.

Fig. 10 is a diagrammatic view of a manually set interval timer with its time controllable switch conditioned to energize the declutching solenoid.

Fig. 11 is a similar view of the time controllable switch conditioned to energize the clutching solenoid.

In Figs. 2 and 4 there is a general disclosure of the dial head of a weighing scale which in detail may be like that more fully disclosed in U. S. Patent No. 2,083,413 granted to G. E. Weist. This dial head may consist of a casing 16 whose hollow throat 11 is perched to swivel about a vertical axis on an underlying cabinet or standard 20 and may carry the dial chart 17 marked with weight designating indicia 18 swept by weight indicating pointer 19 rotatably carried on spindle 21. This pointer spindle is journaled in a frame 22 fixedly mounted in the dial head unit and which supports pivotally the load counterbalancing pendulums 23 that are caused to swing upward and outward in Fig. 1 responsive to the downward pull of a weighable load on draft rod 13 transmitted through flexible ribbons 24. In the aforesaid patent there is fully illustrated and described a mechanism 25 that transmits movement from pendulums 23 to the pointer spindle 21.

It will be understood with reference to Fig. 9 that the draft rod 13 extends to any suitable lever or system of levers (not shown) supporting a receptacle 14 for a load to be weighed. For the purposes of the present invention such weighable load receptacle will consist preferably of a liquid container 15 with means 12 permitting the contained liquid to pass out of the weighable load receptacle at a regulatable rate of flow and thereby decrease the weighable load progressively. The liquid may consist, for example, of a body of lubricating oil that is being fed to the bearings of a motor or some other moving machine parts, or may consist of gasoline fuel being fed to the cylinders of an internal combustion engine.

The hub 26 of weight indicating pointer 19 is recessed to provide a conical clutch face 27 accessible at the front end of spindle 21 and is secured to the latter by a pin 28.

Chart 17 is covered and protected in conventional manner by a circular window 29 of transparent material which may be a disc of glass spaced forwardly from the chart so as to form the pointer chamber 30. This window is firmly held by means of its peripheral edge in a mounting ring 32 retained by the bezel 33 which is removably secured by screws 34 to the chamber-surrounding barrel 35 that in turn is supported by the back plate 36 carried fixedly on casing 16. Fig. 4 makes clear that the chart 17 is also carried by back plate 36 being removably secured thereto by screws 38.

In one possible form of the present improvements a circular aperture is cut in window 29 to fit and receive a round stationary bearing sleeve 39 disposed coaxially with the spindle 21 of the weighing pointer. Sleeve 39, by means of its mounting flange 40, is secured firmly to window 29 by means of fastening screws 41, each of which penetrates window 29 and has threaded engagement with mounting flange 40. A thrust washer 42 is also penetrated by screws 41 and clamped by the head of these screws against the front surface of window 29. Suitable gaskets 43, 43 are interposed between flange 40, washer 42, and the window 29 to prevent strain and breakage of the material of which the window may be composed if it be glass or some other brittle substance.

The forwardly elongated end of bearing sleeve 39 serves to support side-by-side solenoid windings 45 and 46 which are separated from each other by insulative washers 47 and are separated from bearing sleeve 39 by insulative bushings 48 and 49 respectively. Solenoid 46 is further separated from thrust washer 42 by an insulative spacer 51 while the front face of solenoid 45 is armored by an insulative facing 52. The extreme forward end portion of bearing sleeve 39 is externally threaded at 53 to receive in threaded engagement therewith the apertured bearing cap 54 which clamps in place the outer race of a ball bearing 55. A similar ball bearing 56 is fixed in a counterbore at the rear end of the bearing sleeve 39.

Plunger shaft 58 is freely rotatable in the ball bearings 55 and 56 and is also free to slide axially with respect thereto. Coaxially with solenoids 45 and 46, shaft 58 carries a plunger armature 59 of magnetically attractable material, preferably of soft iron, which is shiftable from one to the other of the different electromagnet fields of the said two solenoids. At its front end, plunger shaft 58 fixedly carries hand knob 60 for turning this shaft. At its rear end and in close proximity to pointer hub 26, shaft 58 carries fixed thereon by a pin 57 or other suitable means the hub 61 of a marker pointer 62 which is fixedly secured on this hub by any suitable means such as rivets 63. The rear peripheral edge of hub 61 is chamfered at 64 to provide a conical clutch face adapted to mate with the clutch face 27 of the weighing pointer hub 26. The front peripheral edge of hub 61 is chamfered to provide a similar conical clutch face 65 adapted to mate with a stationary conical brake face 66 formed in the rear end of stationary bearing sleeve 39. The marker pointer 62 is longer than is the weight indicator pointer 19 and sweeps over a different series of graduations 67.

A conductor leading to one end of solenoid winding 45 is indicated at 68. A similar conductor 69 is connected to one end of the other solenoid 46. A conductor 70 divides into two leads which connect respectively to the opposite ends of both said solenoid windings. In Fig. 8 circuit connections are shown including the three above described conductors and showing that conductor 70 may connect to one line 71 of the mains while the conductors 68 and 69 terminate respectively at two switch contacts 72 and 73, one of which is always open. As indicated diagrammatically by the two-way current switching arm 74, either of contacts 72 and 73 may selectively be connected to the other line 75 of the mains so that by means of this switch 74 either one or the other, but not both, of solenoids 45, 46 may individually be energized electrically.

In one way of practising this invention it is the purpose to shift current switching arm 74 into electrical contact with circuit terminal 73 for a definite limited interval of time thereby to energize solenoid 46 for the duration only of such accurately known lapse of time. Accurate timing of this interval may be accomplished manually by referring to some conventional form of time piece or to a stop watch or the like as a timing guide as to when to shift the switch arm 74 to make and to break contact with terminal 73. Automatic time controlled operation of this current switching arm 74, or its current switching equivalent, may be found to be more convenient. For this purpose use may be made of a time controlled switch to serve the purposes of switch 74. A preferred type of time controlled switch will be capable of being pre-set to predetermine a definite interval of time that will elapse between making and breaking of contact between 73—74. Such time switches are available in many makes and kinds. They may be of the type which automatically both makes and breaks contact between 74 and 73 at pre-set times, or they may be of the type which automatically only breaks such contact a pre-set time after such contact has manually been made. They may incorporate double-throw or two-way switches adapted simultaneously to make one circuit and break another circuit and then vice versa, as is the function of switch arm 74 in Fig. 8 with respect to the two different circuit terminals 72 and 73, respectively, where there are two solenoids to be energized alternately. The time movements of such time controlled switches may be powered by escapement retarded spring driven motors or by small synchronous electric clock motors. Such timing movements may be started by direct manual actuation or through electrical effects translated from a remote point of control. It will be needless to describe in fuller detail the many kinds of time controlled switches that can be used for the purpose of measuring or automatically determining the definite length of time that solenoid 46 shall remain energized through the action of switch 74. One example of a time controlled switch of the double-throw or two-way type capable of serving the purpose of switch 74 is shown in U. S. Patent No. 1,984,204, granted December 11, 1934. Particular reference may be made to Figs. 30 to 33 of the drawing of said patent wherein a conductor designated "Y" is shown which leads current to both of two oppositely acting solenoids, comparable to applicant's conductor 70 herein, and two other conductors "X" and "Z" are shown which lead current separately to said respective solenoids comparable to applicant's conductors 68 and 69 herein. In a normal or starting condition as shown in Fig. 30 of said patent (Fig. 10 herein), a circuit through only one of the two solenoids is made. Upon manually turning a time setting and switch control handle 77 shown in said patent and herein from its position in Fig. 10 herein to its position in Fig. 11 herein, the current is thereby manually switched from that solenoid to a second oppositely acting solenoid. At the end of a preset definite interval of time, contact 23 of the patent becomes automatically switched back to its position shown in Fig. 30 of the patent (Fig. 10 herein) and restores current to the first solenoid, at that time leaving the second solenoid again out of circuit. Figs. 17 to 20 of the same patent show a different switching and circuit arrangement for placing two alternately energizable circuits "A" and "B" under interval timed control.

The whole operation may first be described without special regard to whether the current switching action of switch 74 is to be timed manually or automatically. In the example herein given the weighing graduations 19 of Fig. 3, chosen merely for purposes of illustration, indicate a total dial chart capacity of 75 pounds. There is an additional series of direct reading rate-of-depletion graduates 67 marked for registering decreases in the weight of the scale-supported load at as high a rate as 4500 pounds per hour. Graduations 18 are spaced and marked to cooperate with the ordinary weight indicating movement of pointer 19 and certain of the rate-of-depletion graduations 67 fall on common radial lines of the chart with certain of the weight indicating graduations 18. For example, in the particular combined series of graduations herein employed to illustrate the broad principle of the invention, the rate-of-depletion graduation marked "60" designates "60 pounds decrease in weight of load per hour." This falls in radical alignment on the chart with the weight graduation marked "74" pounds. Rate-of-depletion graduation marked "120" pounds per hour aligns with weight graduation "73" pounds, etc. Since in the present instance the progressive load change whose rate is to be registered directly against graduations 67 by the marker or excursion pointer 62 constitutes a depletion or decrease in weight, pointer 19 will progress counterclockwise as the load weight progressively lessens. For this reason the rate-of-depletion graduations are numbered additively in a counterclockwise direction. If the load change constituted an increase in weight, indicia 67 would be numbered additively in a clockwise direction.

For example of a practical use, it may be assumed that a freely weighable receptacle 15 containing 69 pounds of lubricating oil rests on the platform 14 of the weighing scale and hence exerts a pull on draft rod 13 which lifts the automatic load counterbalancing pendulums 23 sufficiently to swing the weighing pointer 19 nearly a full circle clockwise from top center, or no-load position, to a position of register with the 69 pound mark on the chart graduations 18 as shown in Fig. 1. Through a suitably regulatable form of liquid outlet such as faucet 12, which must not interfere with accurate weighing of the scale-supported receptacle, it will be assumed that the lubricating oil is permitted to drain out of the scale-supported receptacle at some unknown rate of flow consumed in feeding the oil to the bearings and working parts of some motor or machine. Such continuous outflow of oil causes progressive decrease in weight of scale-supported load consisting of the receptacle and its contained oil. It is desired by means of my improved rate measuring instrument to ascertain the rate of outflow of the oil. This of course will be proportional to the rate of decrease in weight of the scale-supported load.

As the weighable load becomes depleted, weighing pointer 19 will travel counterclockwise over graduations 18 away from its position shown in Fig. 1. However the marker or excursion pointer 62 can at first remain undisturbed and stationary at its top center or zero position because electric switch 74, as shown in Fig. 8, is at first positioned to energize only the solenoid 45 through the circuit 75, 74, 72, 68, 45, 70 and 71, the lines 71 and 75 being regarded as the supply mains. Under these circuit conditions, the plunger armature 59 is urged forward, or toward the left in Fig. 4, by the magnetic attraction of solenoid 45 which while energized tends to centralize this armature in relation to the magnetic field of solenoid 45 and thus tends to pull it away from centralized relation to solenoid 46. This magnetic pull of solenoid 45 separates clutch face 64 from clutch face 27 and maintains the brake face 65 pressed against the brake seat 66 thereby to exert friction which holds excursion pointer 62 yieldably stationary in any rotary position.

Exactly when weighing pointer 19 starts moving or later while it is moving counterclockwise, switch 74 may be shifted from contact with circuit terminal 72 to contact with circuit terminal 73 thereby deenergizing solenoid 45 and simultaneously energizing solenoid 46 through the circuit 75, 74, 73, 69, 46, 70 and 71 in Fig. 8. Thereupon the magnetic pull of solenoid 45 on armature 59 in a forward direction ceases and in its place there is set up by the electromagnetic attraction of solenoid 46 a rearward pull on said armature, toward the right in Fig. 4. This rearward pull separates the braking surfaces 65, 66 and at the same instant thrusts clutch face 64 against clutch face 27 causing excursion pointer 62 to be picked up and impelled counterclockwise in unison with the counterclockwise traveling weighing pointer 19, so that the angle of separation between these pointers, as appearing in Fig. 1, remains a constant throughout the travel of both pointers in unison from their positions shown in Fig. 1 through their positions shown in Fig. 5 to, say, their positions shown in Fig. 6. The latter position is assumed to be reached by the two pointers exactly at the expiration of the definite known time interval hereinbefore referred to and which if desired may be automatically determined as hereinbefore discussed. At this point, switch 74 is shifted back to its original position shown in Fig. 8 thus again deenergizing solenoid 46 and reenergizing solenoid 45 which transfers the hub 61 of excursion pointer 62 away from impellable engagement with hub 26 and restores it to stationary braked engagement with frame bearing sleeve 39.

Excursion pointer 62 thus becomes instantly arrested in its position shown in Fig. 6 while the weighing pointer 19 is left free to continue its counterclockwise travel to, say, top center or zero position as shown in Fig. 7 as the weight of the load continues to decrease until the scale-supported receptacle becomes entirely emptied of oil. Marker pointer 62 can be reset for a subsequent time controlled rate measuring excursion of marker pointer 62 by grasping hand knob 69 and turning this pointer clockwise back to its top center or zero position against the yielding resistance of the friction brake faces 65, 66. In zero position pointer 62 can conveniently be arrested by stop 76. The usual tare beam (not shown) in the weighing scale mechanism can be utilized in conventional manner to offset the weight of the eempty oil receptacle employed.

In the operation which has been described it is seen that the weighing pointer is permitted to move over any random distance within its range of weighing travel in correspondence as usual with progressive change or decrease in load weight and that at any random point throughout this entire range of travel the excursion pointer 62 may instantly be coupled to the weighing pointer 19 and may at such random point begin to travel in unison with the weighing pointer for some definite chosen interval of time.

In carrying out such practical example of use one minute may conveniently be chosen as the definite time interval during which the marker pointer 62 shall be caused to travel in unison with the weighing pointer 19. If this time limited excursion of the marker pointer away from top center or "zero" position begins when the weighing pointer is exactly at the 69 pound mark as in Fig. 1 and ends when the marker pointer is left stationed as in Fig. 6, the marker pointer will be found resting in register with one of the graduations 67 which is marked to designate, say, 2700 pounds per hour which will have been the average rate of decrease in weight of the weighable load during the one minute excursion of the marker pointer. Since the marker pointer performed its excursion in unison with the travel of the weighing pointer both pointers traveled through the same number of degrees of rotation during the one minute time interval. It follows that the marker pointer traversed $2700/4500$ or $3/5$ of 360 degrees, or 216 degrees of travel. Therefore the decrease in load, measured in pounds, was during this same one minute interval $216/360 \times 75$ pounds or 45 pounds.

Without the benefits of this invention it would have been required to observe that the weighing pointer in one minute moved between two points along the series of weighing graduations 18 whose differential equalled 45 pounds, and then from this data to compute the rate of load change by multiplying 45 pounds by 60 in order to find the number of pounds of load change, namely, 2700 pounds per hour. Lost time and labor and great liability to manual error in observation and recording would be occasioned. By means of these improvements no attention of the operator is necessary beyond once pushing a button, or once turning the time starting handle of a time controlled electric switch whenever a measurement of rate of flow is to be started. After that all the operator has to do is to return at any convenient time and observe the direct reading of the indicium of graduations 67 at which the marker or excursion pointer 62 has automatically been left stationed. From this is immediately known without computation or loss of time the average rate of load change in terms of pounds per hour that has taken place during the particular time interval of the test. Weighing graduations 18 need be referred to only in order to know whether the scale-supported receptacle contains enough oil for the purposes of the test. Otherwise graduations 18 and pointer 19 could be eliminated entirely with loss of the ability to read the scale measured weight of load since the present improvements make it unnecessary to know the amount of load weight in order to determine rate of load change.

These and many other modifications are within the scope of constructions contemplated and intended to be covered by the following claims whose terms are therefore not limited in meaning to the particular forms of the invention herein disclosed.

I claim:

1. In a meter for registering rate of change in a magnitude of weight, the combination of, an excursion performing rate of change indicator normally free from motivating bias, means to set said unbiased rate indicator at a constant initial locus, instrumentalities operative to measure a changing magnitude of weight whose rate of change is to be registered by said indicator, a weight measuring pilot connected to travel in response to said instrumentalities over distances proportioned to change occurring progressively in said magnitude of weight, a mechanical connection operatively associating said indicator and said pilot operative upon occasion to cause said unbiased indicator to perform an unresisted excursion of travel away from said locus definitely and continually proportioned in extent to the simultaneous travel of said pilot, means operative upon said connection in a manner to disable the latter and thereby disassociate said indicator from said pilot when the former is either at or away from said locus thereby to enable said indicator to dwell free of motivating bias at times while said pilot continues to travel in response to continuing change in said magnitude of weight.

2. In a meter for registering rate of change in a magnitude of weight, the combination of, an excursion performing rate of change indicator normally free from motivating bias, means to set said unbiased rate indicator at a constant initial locus, instrumentalities operative to measure a changing magnitude of weight whose rate of change is to be registered by said indicator, a weight measuring pilot connected to travel in response to said instrumentalities over distances proportioned to change occurring progressively in said magnitude of weight, a mechanical connection operatively associating said indicator and said pilot operative upon occasion to cause said unbiased indicator to perform an unresisted excursion of travel away from said locus definitely and continually proportioned in extent to simultaneous travel of said pilot, means operative upon said connection in a manner to disable the latter and thereby disassociate said indicator from said pilot at selective times, and mechanical detentive means operatively associated with said indicator in a manner to arrest the latter at said selective times while said pilot continues to travel in response to continuing change in said magnitude of weight.

3. In a rate meter, the combination defined in claim 1, together with plural electromagnets located at a common side of and operatively related to the said mechanical connection in a manner to control therethrough the association and disassociation of the said indicator and the said pilot.

4. In a rate meter, the combination defined in claim 2, together with plural electromagnets located at a common side of and operatively related to the said mechanical detentive means in a manner to control the arresting thereby of the said indicator.

5. In a rate meter, the combination, defined in claim 2, together with an electromagnet located at one side of the said mechanical connection and the said detentive means and operatively related to the former in a manner to control therethrough the association and disassociation of the said indicator and the said pilot, and another electromagnet located at the said side of the said mechanical connection and said detentive means and operatively related to the latter in a manner to control the arresting thereby of said indicator.

6. In a rate meter, the combination defined in claim 1, in which the said means operative upon the said connection includes hand set time controlling mechanism acting automatically to disable the said connection for disassociating the said indicator from the said pilot at the expiration of a predetermined interval of time.

7. In a rate meter, the combination defined in claim 2, in which the said means operative upon the said connection includes hand set time controlling mechanism acting automatically to disable said connection for disassociating the said indicator from the said pilot at the expiration of a predetermined interval of time, and in which the said detentive means is operably related to said time controlling mechanism.

8. The combination of, automatic load counterbalancing apparatus, means to apply loads of progressively varying weight to said apparatus in a manner to prevent said apparatus from resting in a state of balance with the load, a pilot connected to be impelled progressively by said apparatus over distances continually proportional to changes of weight in said load, a movable marker normally free of motivating bias, movement transmitting mechanism connecting said unbiased marker impeliably to said pilot upon occasions, and means selectively to disable said mechanism so that said unbiased marker can stand at rest while said pilot travels.

DONAL J. DWYER.

REFERENCES CITED

The following references are of record in the file of this patent:

UNITED STATES PATENTS

| Number | Name | Date |
| --- | --- | --- |
| 717,376 | Fish et al. | Dec. 30, 1902 |
| 961,559 | Trafford | June 14, 1910 |
| 1,355,183 | Stuber | Oct. 12, 1920 |
| 1,412,586 | Welch | Apr. 11, 1922 |
| 1,493,125 | Pastor | May 6, 1924 |
| 1,638,972 | Walker | Aug. 16, 1927 |
| 1,911,777 | Taylor | May 30, 1933 |
| 1,933,356 | Warner | Oct. 31, 1933 |
| 2,083,413 | Weist | June 8, 1937 |
| 2,085,345 | Tuttle et al. | June 29, 1937 |
| 2,103,077 | Herron | Dec. 21, 1937 |
| 2,169,048 | Howe et al. | Aug. 8, 1939 |
| 2,173,575 | Binns | Sept. 19, 1939 |
| 2,189,107 | Gould | Feb. 6, 1940 |
| 2,216,737 | Crane et al. | Oct. 8, 1940 |
| 2,262,008 | Kollsman | Nov. 11, 1941 |
| 2,302,458 | Miner | Nov. 17, 1942 |
| 2,322,374 | Lowe | June 22, 1943 |

FOREIGN PATENTS

| Number | Country | Date |
| --- | --- | --- |
| 57,020 | Denmark | Dec. 11, 1939 |
| 316,412 | Great Britain | Aug. 1, 1929 |
| 375,186 | Germany | May 8, 1923 |